US008645969B2

(12) United States Patent
Shah et al.

(10) Patent No.: US 8,645,969 B2
(45) Date of Patent: Feb. 4, 2014

(54) METHOD FOR DYNAMIC DISCOVERY OF PROCESSORS AND PROCESSOR CAPABILITIES

(75) Inventors: Jimi A. Shah, Broomfield, CO (US); Thomas M. Rebman, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 13/299,971

(22) Filed: Nov. 18, 2011

(65) Prior Publication Data
US 2013/0047168 A1   Feb. 21, 2013

Related U.S. Application Data

(60) Provisional application No. 61/525,657, filed on Aug. 19, 2011.

(51) Int. Cl.
*G06F 9/54* (2006.01)
(52) U.S. Cl.
USPC ............................ 719/313; 718/104; 375/222
(58) Field of Classification Search
None
See application file for complete search history.

(56) References Cited

U.S. PATENT DOCUMENTS

| 4,718,002 | A | 1/1988 | Carr | |
|---|---|---|---|---|
| 7,395,333 | B1 | 7/2008 | Saulpaugh et al. | |
| 7,716,520 | B2 | 5/2010 | Tabei et al. | |
| 7,783,696 | B2 | 8/2010 | Davis et al. | |
| 2006/0288209 | A1* | 12/2006 | Vogler | 713/168 |
| 2007/0124439 | A1* | 5/2007 | Shah et al. | 709/223 |
| 2007/0224988 | A1* | 9/2007 | Shaheen | 455/436 |
| 2010/0146222 | A1 | 6/2010 | Cox et al. | |
| 2012/0136944 | A1* | 5/2012 | Stewart et al. | 709/206 |
| 2012/0159218 | A1* | 6/2012 | Vangala et al. | 713/323 |

FOREIGN PATENT DOCUMENTS

| EP | 1686465 A2 | 8/2006 |
|---|---|---|
| EP | 2018000 A1 | 1/2009 |

OTHER PUBLICATIONS

Ming Hoong Chong, Optimize inter-processor communication in dual baseband dual mode handsets, Mar. 3, 2008, pp. 1-5.*
International Search Report and Written Opinion—PCT/US2012/047707—ISA/EPO—Oct. 31, 2012.
Williams D., "Mobile Broadband and Qualcomm Proprietary Protocols", Internet citation, Apr. 15, 2010, XP002685008, Retrieved from the Internet: URL: http://blogs.gnome.org/dcbw/2010/04/15/mobile-broadband-and-qualcomm-proprietary-protocols/ [retrieved on Oct. 8, 2012].

* cited by examiner

*Primary Examiner* — H S Sough
*Assistant Examiner* — Syed Roni
(74) *Attorney, Agent, or Firm* — Nicholas A. Cole

(57) ABSTRACT

The various aspects include methods and apparatus that enable processors within a multi-processor computing device to automatically discover each other and to configure themselves to interoperate utilizing at least two agents in a scalable inter-processor communication protocol. A dynamic method of advertising capabilities of processors uses a scalable communication format that can be discover and linked to each processor to enable sharing of processing resources. To enable processor-discovery, each processor may be configured with a foreign agent, a local agent and a service daemon software program that facilitates processor auto-discovery and auto-configuration. Advertising and capabilities messages between processors in the same device may use the QMI protocol format. The advertised capabilities may include information regarding processor identification, transport type, port, technology, services and resources. The method may enable processors to automatically configuring themselves to work with or utilize the capabilities of the other discovered peer processors.

75 Claims, 13 Drawing Sheets

METHOD FOR DYNAMIC DISCOVERY OF
PROCESSORS AND PROCESSOR
CAPABILITIES

RELATED APPLICATIONS

This application claims the benefit of priority to U.S. Provisional Patent Application No. 61/525,657 entitled "A METHOD FOR DYNAMIC DISCOVERY OF PROCESSORS AND PROCESSOR CAPABILITIES" filed Aug. 19, 2011, the entire contents of which are hereby incorporated by reference.

FIELD

The aspects of the invention relate to a dynamic scalable solution for the dynamic discovery of processors in multi-processor computing devices.

BACKGROUND

Mobile computing devices have seen explosive growth over the past few years. With growing computational power and memory capacity, personal computing devices have become essential tools of modern life, providing telephone and text communications, navigation, photo, and video functionality in a package that fits in one's pocket. As a result of providing so many different types of radio frequency communications services and displaying high-quality video, many smart phones and similar mobile computing devices are now configured with a large number of programmable processors. Most devices included processors supplied by different companies, and are subject to different development and improvement cycles.

Currently, developers of programmable computing devices must configure each processor to interact with all other processors within the device. As electronic devices (e.g., smart phones) become even more sophisticated, the number and variations of processors (e.g., modem processors, GPS receivers, display processors, etc.) are increasing. Since device designs may change frequently and different model processors may be added in or swapped out, this need to configure processors can be time consuming and can lead to model testing failures when not properly completed. Additionally, many modern computing devices include an application processor and a number of other processors. For example, a smartphone may include an application processor that must function in conjunction with several other peer processors including, for example, a graphics processor, one or more modem processors, and a GPS processor.

SUMMARY

The various aspects include a method and apparatus for discovering processors utilizing at least two agents in a scalable inter-processor communication protocol. A dynamic method of advertising processor capabilities to other processors within the same device uses a scalable communication format that can be discovered and linked to the processor to share processing resources. The aspects may enable processor-discovery by configuring each device processor with a foreign agent, a local agent, and a service daemon software program that facilitates processor auto-discovery and auto-configuration.

In an aspect, a method includes advertising an availability of a first processor within a device by communicating a first message in a processor scalable communication format utilizing an agnostic, scalable inter-processor communication link, an example of which is the Qualcomm® MSM/Modem Interface (QMI) protocol format. The method may also include receiving the advertised availability by a second processor and using the first message in the second processor to discover the capabilities of the first processor. The first message may comprise at least one of identification information, transport type information, port information, technology information, features information, any other first processor specific information that the second processor may benefit from and any combinations thereof. The method may also include automatically configuring the second processor to work with or utilize the capabilities of the first processor.

In another aspect, a method includes communicating identification data locally and writing data in Extensible Markup Language (XML) format to a memory and reading data from the memory. In one aspect, data is locally accessible and is replicated to various local data storages and the method does not utilize a shared memory. The method may also include automatically configuring the second processor to work with or utilize the capabilities of the first processor by using the processor-capabilities information recalled from the local memory. A foreign agent in the first processor may generate the capabilities advertisement and a foreign agent in the second processor received the capabilities advertisement and passes those capabilities to a service daemon. The service daemon may write data to the memory. The method may also include automatically configuring the second processor to work with or utilize the capabilities of the first processor by a local agent obtaining the stored data from memory via the service daemon, and using those capabilities to accomplish inter-processor communications.

In a further aspect, a method of exchanging identification data via a daemon software program operable on a processor of the device and communicating advertisements between processors within the same device via the agnostic, scalable inter-processor communication link (e.g., the QMI protocol) may include using the first message in the second processor to discover the capabilities of the first processor which may comprise the first processor name. The transport information may comprise a transport type for the first processor. The port information may comprise the first processor port name or the first processor port identification. The technology information may comprise a technology mask parameter that identifies technologies associated with the advertising first processor. The advertisements may further include any other first processor specific information that the second processor may benefit from. In another aspect, the method may include advertising the availability of the first processor by communicating the first message utilizing the agnostic, scalable inter-processor communication link (e.g., the QMI protocol), wherein the first processor and the second processor are located on the same die or within the same device. In a further aspect, the foreign agent may be an entity performing bidirectional message exchanges between the first processor and the second processor. The foreign agent may also perform bidirectional message exchanges with the service daemon. In an aspect, a second device having multiple processors may link and discover processing capabilities of a first device having multiple processors in a rapid manner.

In a further aspect, the method may include advertising the availability of the first processor within the device by communicating a first message that is an agnostic, scalable inter-processor communication. As an example, the Qualcomm MSM/Modem Interface (QMI) protocol format may be used to provide the inter-processor communication link the QMI protocol is agnostic to a physical transport utilized between the first and the second processor.

In another aspect, the method may further include a foreign agent associated with the second processor registering with the service daemon to receive property value change notifications. The registration functionality provided by the service daemon notifies registered local and foreign agents of changes in property values without a need for polling. In another aspect, the service daemon may deliver a notification message to the registered foreign agent. The notification message may be delivered whenever the processor property is changed by the local agent and/or when the processor property is updated in the memory.

In another aspect, the method may also include providing a notification to the local agent when a processor property is updated by the foreign agent. The service daemon may provide the notification to the local agent when the processor property is updated by the foreign agent. In another aspect, the notification to the local agent may be delivered when a processor property is updated by the foreign agent if the local agent registers to receive updates for the processor property from the foreign agent.

The various aspects include a multi-processor computing device in which the processors are configured with processor-executable instructions to perform operations of the above described methods. The various aspects include a non-transitory processor-readable storage medium having stored thereon processor-executable instructions configured to cause processors of a multi-processor computing device to perform operations of the methods described above.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
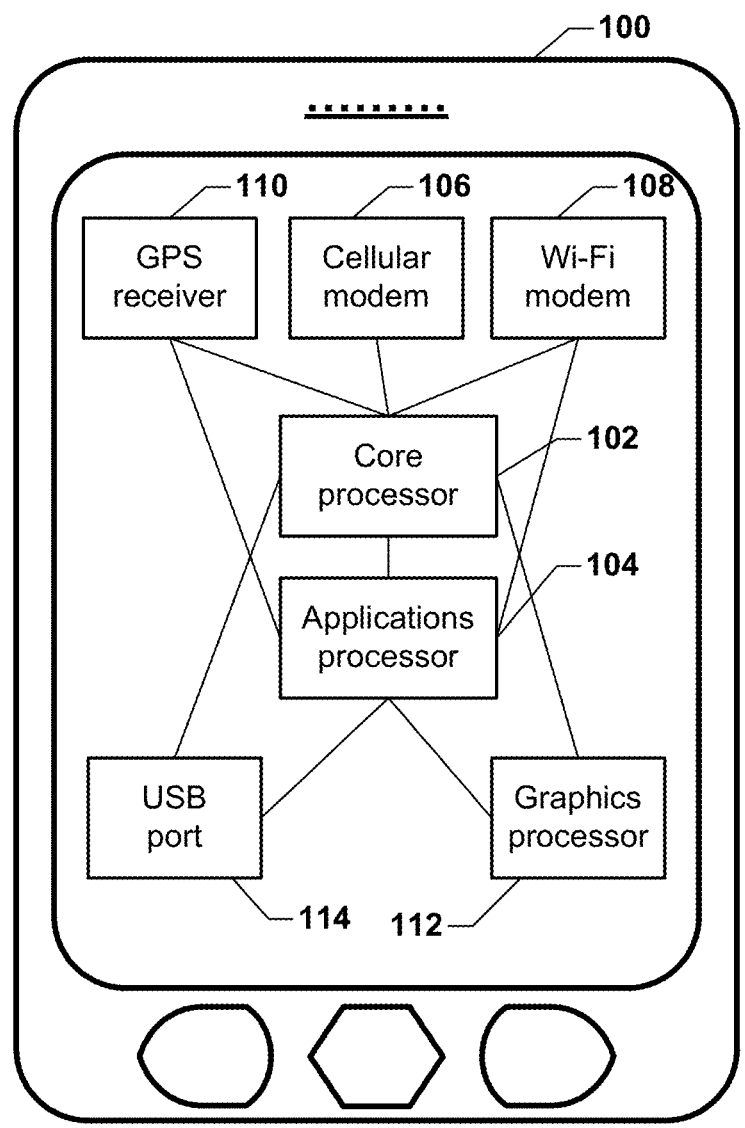
FIG. 1 is a diagram of a wireless network device that supports access terminals and access networks in accordance with an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. Alternate aspects may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any aspect described herein as "exemplary" and/or "example" is not necessarily to be construed as preferred or advantageous over other aspects.

As used herein, the terms "computing device" and "mobile computing device" refer to any one or all of cellular telephones, smart phones, personal data assistants (PDA's), palm-top computers, tablet computers, notebook computers, personal computers, wireless electronic mail receivers, multimedia Internet enabled cellular telephones, and similar electronic devices which include multiple programmable processors, and memory.

As mobile computing devices become ever more sophisticated in terms of their functionality and processing capabilities, the number of included programmable processors within a given device is expected to increase. Currently, developers of programmable devices must configure processors to interact with other processors within the device. As the number and variations of processors (e.g., modem processors, GPS receivers, display processors, etc.) within a given device increases, this processor-by-processor configuration can become time-consuming. Since device designs may change frequently and different model processors may be added in or swapped out, this need to configure processors can lead to delays in introducing updated models and to model testing failures when not properly completed.

To overcome these challenges, the various aspects provide a dynamic method for processors in a computing device to discover the capabilities of other processors in the same device. Specifically, the aspects include a dynamic method for advertising capabilities of each processor within a given multi-processor computing device using a scalable communication format that enables each processor to discover and link to others to share processing resources. The aspects enable processor-discovery by configuring each processor within the computing device with a foreign agent, a local agent, and a service daemon software program that facilitates processor auto-discovery and auto-configuration. The foreign agent on each processor may advertise its processor capabilities to other processors within the same computing device and receive processor capabilities advertised by other processors. The service daemon receives capabilities information received by the foreign agent and stores the capabilities information in non-volatile memory. The local agent uses the service daemon to discover processor capabilities stored in the non-volatile memory. A second processor having the same type of foreign agent, local agent, and service daemon software programs may receive the capabilities advertisement, which is in a scalable communication format, and then configure itself to link to the first processor and to share processing capabilities. In particular, the aspects utilize an agnostic, scalable inter-processor communication link such as QMI protocol format messaging for accomplishing the advertising and discovery of processor capabilities, as well as storage and retrieval of received capabilities information. For ease of description, the following detailed description and the drawings refer to the QMI protocol and QMI protocol format messages, because QMI is an example of an agnostic, scalable inter-processor communication link suitable for use with the various aspects. However, the claims are not limited to the QMI protocol unless specifically recited in the claims.

The methods and apparatus of the various aspects enable a first processor within a computing device to send a first message to all other processors within the computing device in a processor scalable communication format such as utilizing a QMI protocol format. The methods also include receiving the advertised availability by a second processor within the same device, and using the first message to configure the second processor to interact with or use the capabilities of the first processor. The advertisement message may include identification information, transport type information, port information, technology information, features information, any other first processor specific information that the second processor may benefit from, and any combinations thereof. The method may also communicate the capabilities information between processors in XML format, which may be stored in a memory and accessed to obtain the processor capabilities for purposes of configuration and interoperations. The method may also include automatically configuring the second processor to work with or utilize the capabilities of the first processor by using processor-capability information recalled from the local memory.

In an aspect, automatic discovery of processors within a multi-processor computing device may be accomplished using a foreign agent in each processor that generates the capabilities advertisement that is sent out all other processors on the same die or within the same device, and receives the capabilities advertisements from all other peer processors on the same die or within the same device. The foreign agent may pass received capabilities information to a service daemon operating within the processor. The service daemon writes the processor capabilities to the memory within or associated with the processor. A local agent in the processor automatically configures the processor to work with or utilize the capabilities of the other peer processors by obtaining the stored processor capabilities from the memory via the service daemon and using those capabilities to accomplish inter-processor communications. The foreign agent, local agent, and service daemon may be implemented within each peer processor within the multi-processor computing device in a similar manner.

The challenge of multiple processors in computing devices, such as smart phones and other mobile computing devices is illustrated in FIG. 1. This figure provides a block diagram of an exemplary smart phone 100 illustrating the types of peer processors that are included in a typical smart phone (e.g., Android® or iPhone phone®). In particular, modern smart phones 100 will often include a core processor 102 which may include a coprocessor for executing applications, sometimes referred to as an application processor 104. The core processor 102 and applications processor 104 may be configured in the same microchip package or in separate chips. While the core and applications processors may be the heart of the smart phone 100, there are typically a number of peer processors associated with important device capabilities including communications, navigation, and graphics. For example, a smart phone 100 will typically include a cellular transceiver or modem 106 which in many cases includes one or more processors whose main task is managing wireless communications. Many smart phones 100 also include other wireless transceivers for communicating over other types of wireless communications networks, such as a WiFi modem 108 for connecting the device to WiFi communication networks. In some cases, the WiFi modem 108 may be a separate transceiver chip, in which case it may also include a separate programmable processor. Other wireless transceivers (not shown) which have embedded programmable processors may be included to connect to other types of wireless communication links, such as near field communications (NFC) links, Bluetooth® links, and links based on other wireless protocols.

In addition to the communications processors, modern smart phones also typically include a GPS receiver 110 which may have its own dedicated processor. Also, a graphics processor 112 may be included in order to provide high-resolution graphics. Some smart phones 100 may also include processors associated with wired communications, such as a USB port 114.

While FIG. 1 shows a smart phone 100 and the following descriptions include frequent reference to mobile computing devices, the claims are not limited to smart phones or mobile computing devices unless specifically recited. The various aspects may be implemented in any multi-processor computing device, such as a server, a laptop computer, a desktop computer, a tablet computer, a television set, a set top box, an automobile or any other computing device known in the art that includes at least two processors.

As mentioned above, currently a developer of such a smart phone 100 would need to configure each of the processors and peer processors within the device so that each processor can interact with and support all of the other peer processors. As FIG. 1 illustrates, a modern mobile computing device includes a large number of processors, so this configuration can be time consuming. Also, if the device manufacturer decides to switch suppliers of any one of the peer processors, such as the GPS receiver 110 or Wi-Fi modem 108, the configuration of each of the processors must be reformed in order to ensure proper operation of the reconfigure device.

In the various aspects, the processors within the computing device 100 are configured to advertise their availability to other processors within the device by communicating a first message in a processor scalable communication format utilizing a QMI protocol format. A second processor within the computing device 100 may receive the advertised availability. The second processor may utilize the first message to discover the capabilities of the first processor. The message may automatically configure the second processor to work with or utilize the capabilities of the first processor within the computing device 100. It should be appreciated that the aspects involve intra-processor communications in a highly scalable format so that as more and more processors are added to the device, each of the processors may learn the capabilities of other processors by receiving capability advertisements.

Figure 2:
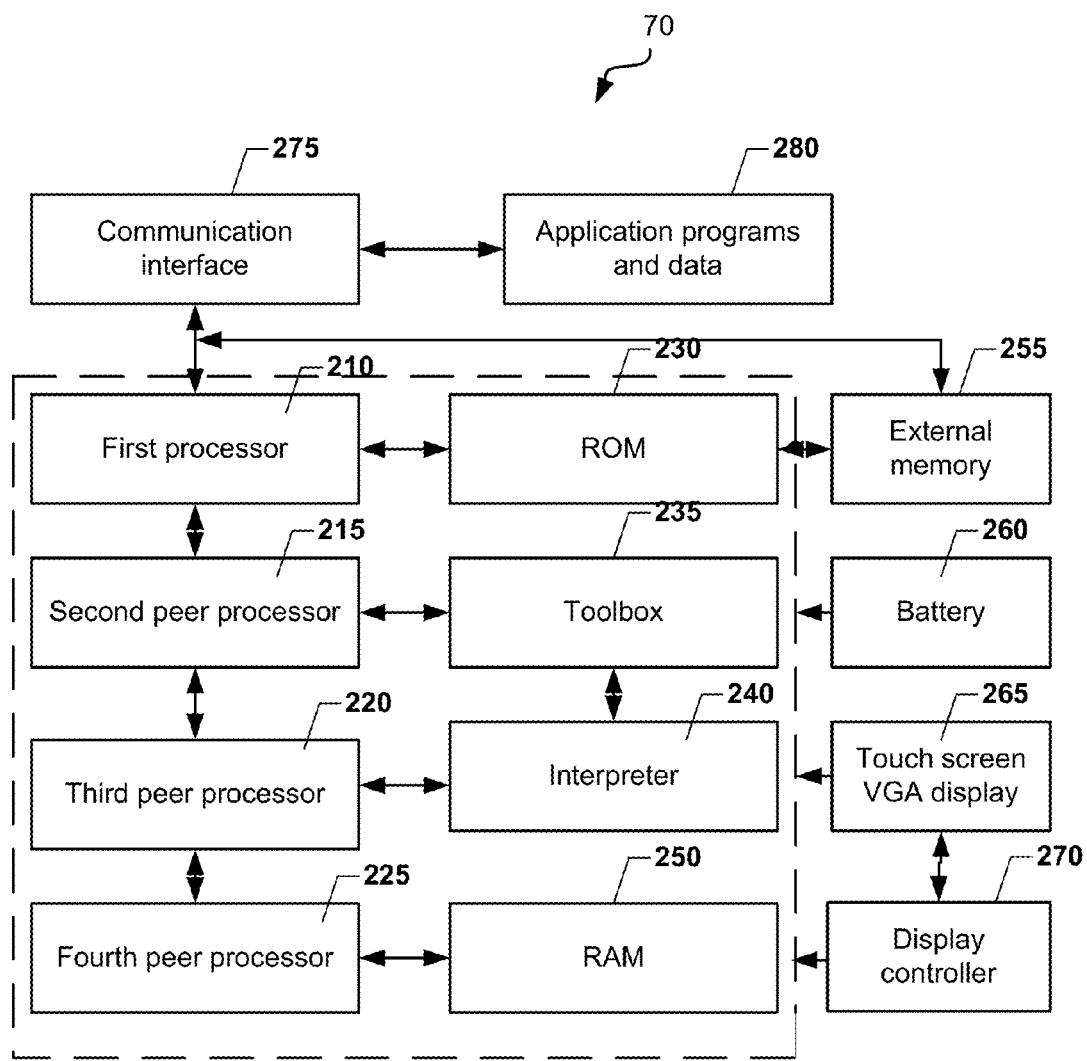
FIG. 2 is a functional block diagram of a mobile computing device suitable for use with the various aspects.

FIG. 2 illustrates an exemplary high level schematic view of a computing device 100 that includes a system on a chip configured so that a processors 210, 215, 220, 225 may automatically discover each other and use the capabilities of one another. In an aspect, the capability advertisement messages may be delivered at various different timeframes, such as at start up, at a boot up of the computing device 100, or periodically after start up. In another aspect, the capability advertisement messages may be delivered when a change in the processor's capability is detected that requires or triggers delivery of the capability advertisement message.

The computing device 100 may include a communication interface 275 that receives application programs and data 280. The illustrated example computing device 100 also includes a first processor 210, a second processor 215, a third peer processor 220 and a fourth processor 225. It should be appreciated that the various aspects may be extended to apply to any number of peer processors. The processors 210, 215, 220, 225 include processors that are on the same die, but also include processors that are all located within the same computing device 100.

The computing device 100 may also include a read only memory (ROM) 230 and a random access memory (RAM) 250 and an external memory 255. The computing device 100 further may include a toolbox 235 in memory and an interpreter 240 that are operatively connected to processors 215 and 220. The computing device 100 may also include a battery 260 or other power source, and user interface, such as a touch screen VGA display 265 that is operatively connected to a display controller 270. The computing device 100 may also include a camera and a speaker for outputting audio (not shown).

Figure 3:
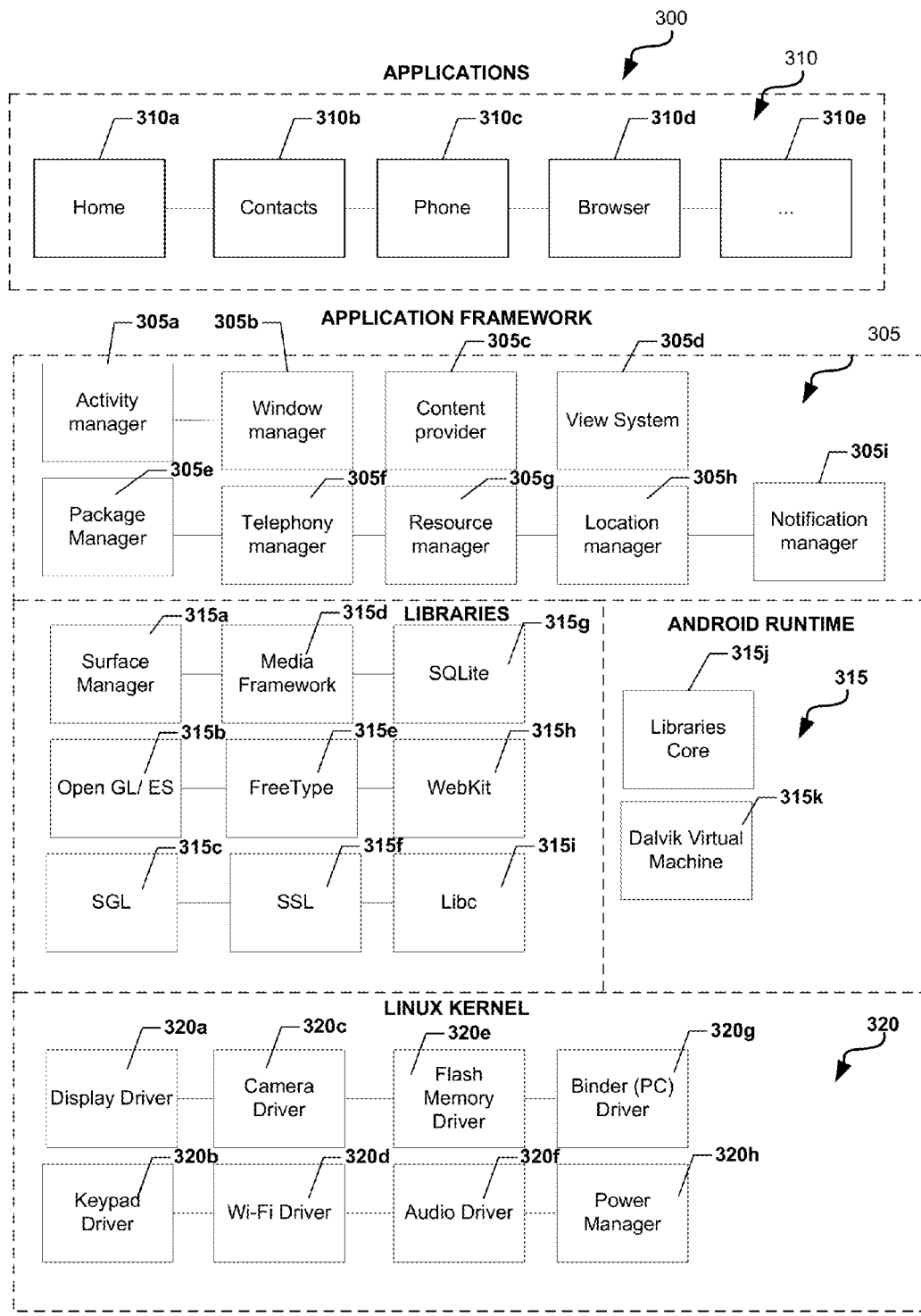
FIG. 3 is a high level software architecture diagram of the mobile computing device of FIG. 2.

FIG. 3 illustrates a high level schematic of software that may be operable with the computing device 100. In one non-limiting aspect, the computing device 100 may be operable as a GOOGLE® ANDROID® mobile phone having a System on a Chip ("SOC"). The computing device 100 may include a number of software blocks including applications 310, a number of application framework blocks 305, a number of software library blocks 315, and a number of LINUX® kernel driver blocks 320.

Generally, the computing device 100 may be configured to include a home application 310a, a contacts application 310b, a phone application 310c, and a web browser application 310d. Other applications 310e, some of which may be downloaded via communication interface 275, may be supplied or implemented on the computing device 100.

The computing device 100 may also include a number of application framework blocks 305, or an activity manager block 305a, a windows manager 305b, a content provider block 305c, a system view block 305d, and a package manager block 305e. The application framework software 305 may further include a telephony manager 305f, a resource manager 305g, a location manager 305h, and a notification manager 305i that are all operable with the applications 310.

The computing device 100 may also further include a number of processor executable software libraries 315. The libraries 315 may include software libraries different from those described herein, and may include a surface manager library block 315a, an OPEN GL ES library block 315b, and SGK library block 315c, a media framework library block 315d, a FreeType library block 315e, an SSL library block 315f, an SQLite library block 315g, a WebKit library block 315h, and an LIBC library block 315i.

The computing device 100 may also include GOOGLE® ANDROID® runtime library blocks including a GOOGLE® ANDROID® library core library block 315j and a Dalvik Virtual machine 315k. The computing device 100 may also include a display driver 320a, a keypad driver 320b, a camera driver 320c, a Wi-Fi driver 320d, a flash memory driver 320e, an audio driver 320f, a power management driver block 320h, and a PC binder driver block 320g.

Figure 4:
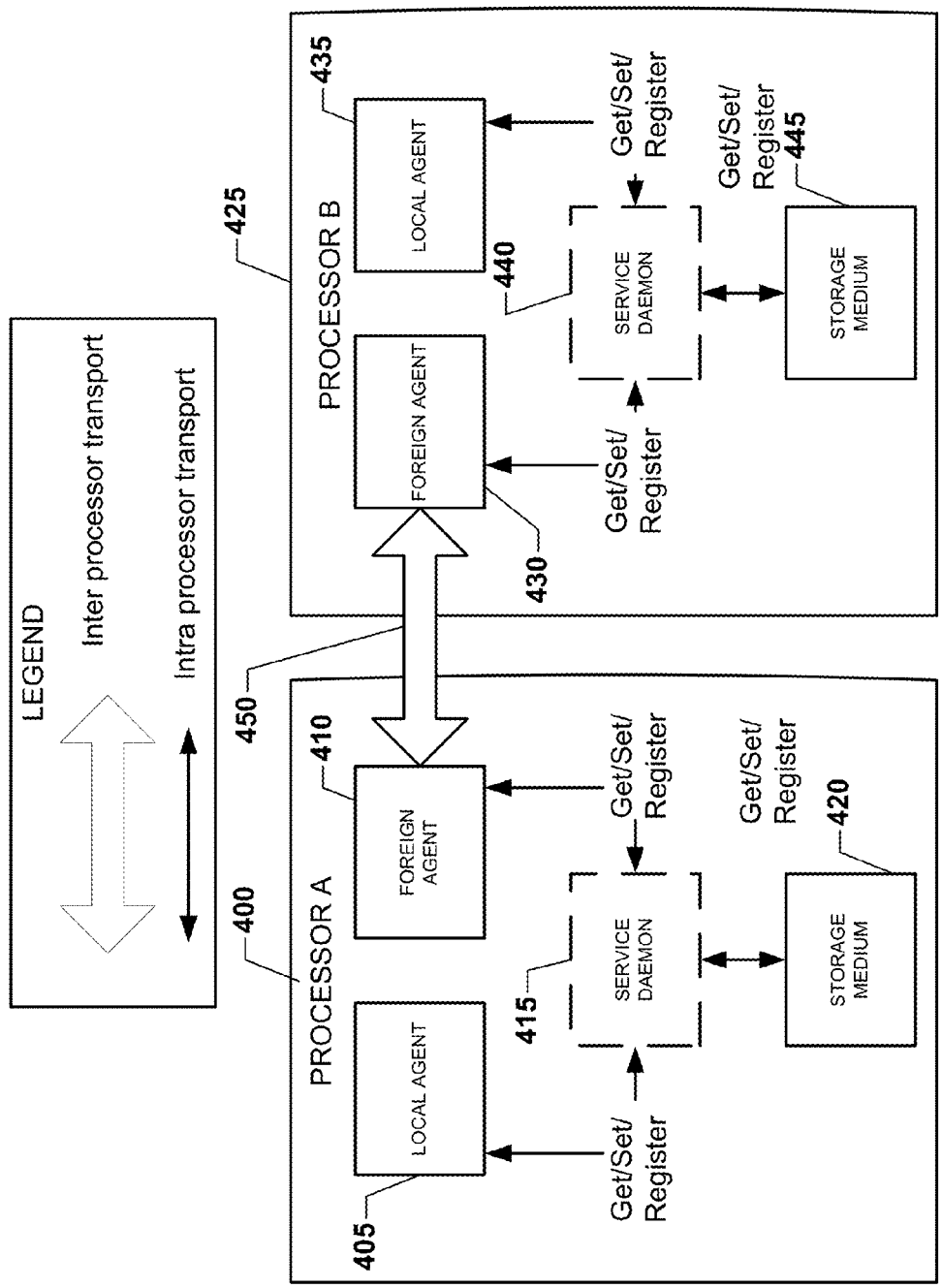
FIG. 4 is an illustration of functional modules and communications pathways of two processors within the same computing device according to an aspect.

FIG. 4 illustrates a diagram of a service model where two processors 400 and 425 are connected. The two processors 400 and 425 may share the capabilities of one another and be scalable for additional peer processors without changing the service model. Foreign agents 410 and 430 are responsible for communication between the processors 400 and 425.

Local agents 405 and 435 are local to the respective processor 400 and 425 and can receive service statements which are locally stored. The local agents 405 and 435 do not communicate with one another. Local agents 405 and 435 and the foreign agents 410 and 430 may be hardware components or software components.

FIG. 4 provides a device architecture where additional processors may be added on an ad hoc basis without extensive efforts. For example, there may be multiple modems in a device, multiple component processors, multiple modem processors, and multiple graphics processors. For ease of discussion, FIG. 4 illustrates just a first processor 400 and a second processor 425 that communicate via the communication 450 between a first foreign agent 410 and a second foreign agent 430. The first foreign agent 410 and a second foreign agent 430 communicate data via the QMI (Qualcomm MSM/Modem Interface) protocol from the first foreign agent 410 to the other second foreign agent 430. The first processor 400 may include a local agent 405 and a first foreign agent 410 that communicate via a software service daemon 415 that may be resident on a storage medium 420. The second processor 425 may also include a second local agent 435, a second foreign agent 430 and a software service daemon 440 that may be resident on a storage medium 445. In another aspect, the availability of the first processor 400 may be communicated by a message that is an inter-processor communication. In this aspect, the Qualcomm MSM/Modem Interface (QMI) protocol format may be used for the inter-processor communication since it is agnostic to a physical transport utilized between the first processor 400 and the second processor 425.

In multitasking operating systems, a daemon is a computer program that runs in the background and may be initiated as a background process. Systems often start or launch daemons at boot time. The daemon computer program serves the function of responding to network requests, hardware activity, or other programs by performing a task.

In one aspect, the service model illustrated in FIG. 4 may be implemented at the processor level, which is advantageous to discover new processors. Additionally, the service model is very scalable in that several processor entities can receive a single message sent from each processor, and each of the several processors can send similar messages so that all processors on the same die or within the same device are able to discover capabilities of every other processor. For example, the protocol of the scalable advertisement capability message is independent of the number of processors and may be recognized by multiple different processors.

For example, the service model uses "get", "set", and "register" messages for accomplishing the advertisement, for storing capabilities information, and for configuring each processor to work with other peer processors. For example, a "set" message is delivered from a foreign agent 410 by the service daemon 415 to a storage medium 420 that includes a value of a property that is set on the storage medium 420. For example, a "get" message is delivered from a foreign agent 410 to obtain the value of the property from the storage medium 420. For example, a "register message" may be a registration message which registers a foreign or local agent with a service daemon to receive automatic notifications when a property value changes without polling for a given property value. The registration message may specify a particular property value for which notification of a change is desired. The service daemon may be configured to provide a registration functionality which automatically notifies the registered foreign and local agents of changes occurring in property values. When the registration message identifies the property value of interest to a registering agent, the service daemon will only notify that agent of changes in the identified property value. Thus, the use of a register message and the service daemon's registration functionality avoids the need for the agent to poll for property value changes. Certain capabilities may change over time, and the processor capability may change, and the service daemon may be configured to determine when the property value changes. For example, a technology mask can be a first predetermined property. For example, a transport may be an additional property. The transport property may include various different transport methodologies, such as a shared memory transport, a serial bus, a parallel bus, Secure Digital Input Output (SDIO), Memory-mapped I/O (MMIO), USB, or any other processor transport.

In operation, one processor 400 may write to the memory 420 using a local agent 405 that communicates the property to the service daemon 415. Upon receiving a notification message, the foreign agent 410 may receive the property from the service daemon 415 and may communicate the property in the form of a service statement to the second foreign agent 430. The second foreign agent 430 may provide the property to the second service daemon 440, which may write the property to the memory 445. At this point, the second local agent 435 may access the property from the memory via the service daemon 440.

Communication between the first processor 400 and the second processor 425 may be accomplished utilizing a predetermined scalable protocol. In one aspect, the communication may be accomplished at the processor level and may determine the processor name, and also the language which the processor supports. In an aspect, the predetermined protocol is the QMI protocol, which is agnostic and is specifically designed to interface to a predetermined chipset which is useful for inter-processor communication and discovery. The QMI protocol is an agnostic and relatively simple architecture that is useful for inter-processor communication.

A service statement may be delivered via a QMI protocol message. The local agents 405 and 435 may register with the service statements. The QMI service statements may be received by the foreign agents 410 and 430 and the service statements may be written to the memory 420 and 445. The local agents 405 and 435 may receive the service statement, which may be written in XML in a scalable manner. It should be appreciated that the memory 420, 445 that stores the capabilities information is not shared across processors 400 and 425. The first memory 420 is shared or accessed by the first local agent 405 and the first foreign agent 410, while the second memory 445 is shared or accessed by the second local agent 435 and the second foreign agent 430. The foreign agent 410 communicates with the second foreign agent 430 using a QMI protocol 450, which may include its own protocol stack.

In another aspect, remote procedure calls (RPC) may be utilized as the protocol 450. A remote procedure call (RPC) is an inter-process communication that allows a computer program to cause a subroutine or procedure to execute in another address space (commonly on another computer on a shared network) without the programmer explicitly coding the details for this remote interaction. For example, the RPC may include the same code, whether the subroutine is local to the executing program or is remote. When the software in question uses object-oriented principles, RPC is called remote invocation or remote method invocation.

For example, the local agents 405, 435 on respective processors 400, 425 may learn of a condition and may set a property on the storage medium 420 and 445. The first and the second processor 400, 425 may identify one another, may set properties, and may have the same XML file in the storage memory 420, 445. When an update is detected, a new service statement may be transmit to the foreign agent 410, which broadcasts the updated service statement to the second foreign agent 430, and which writes the XML file to the second memory 445. The second local agent 435 may access the updated service statement from the second memory 445.

In an aspect, data may be exchanged in a manner that is accessible from the first and the second processors 400 and 425 so the second processor 425 may read the capabilities of the first processor 400. For example, processor capabilities may be written in an XML format to the first memory 420 or second memory 445, and the second processor 425 may read processor capabilities from the second memory 445. The second processor 425 may be automatically configured to work with or utilize the capabilities of the first processor 400 by using the read processor capabilities. For example, a foreign agent 410 in the first processor 400 may generate a capabilities advertisement, which may contain various data.

A second foreign agent 430 in the second processor 425 may receive the capabilities advertisement and may pass the capabilities to the service daemon 440. The service daemon 440 may write the processor capabilities to the memory 445. This may automatically configure the second processor 425 to work with or utilize the capabilities of the first processor 400 by a second local agent 435 obtaining the stored first processor capabilities from the memory 445 via the service daemon 440 and using those capabilities to accomplish inter-processor communications. In an aspect, advertisements may be communicated between the processors 400 and 425 within the same device 100 and the advertisements may be managed utilizing the QMI protocol by a QMI control driver. In one embodiment, the QMI protocol format is ported on top of a networking protocol that optionally may be a Transmission Control Protocol/Internet Protocol (TCP/IP) networking protocol, or another networking protocol. In another embodiment, the QMI protocol may extend beyond the device.

In another aspect, the foreign agent 430 associated with the second processor 425 may register with the service daemon 440 to receive notifications of property value changes. As noted above, the registration may identify a property value about which the foreign agent 430 is interested in receiving change notices. The service daemon 440 may be configured to deliver a notification message to the registered foreign agent 430 when a property value changes. When the registration identifies a property value about which the foreign agent 430 is interested in receiving change notices, the service daemon 440 may send notification messages to that foreign agent when the identified property changes.

The notification message may be delivered by the service daemon at various intervals in response to various events. For example, the notification message may be delivered whenever the processor property is changed and updated. In another aspect, the service daemon 440 may provide a notification to the local agent 435 when the processor property is updated by the foreign agent 430. In another aspect, the notification may be delivered a time period after the property is updated. In a further aspect, the notification may be provided in anticipation of the change and then confirmed later. In another aspect, a registration may be required to receive the notification. For example, a notification to the local agent 435 may be delivered when a processor property is updated by the foreign agent 430 and if the local agent 435 registers to receive updates for the processor property from the foreign agent 430. In another aspect, registration may be provided based on a preset processor configuration or may be initiated by the particular entity.

Figure 5:
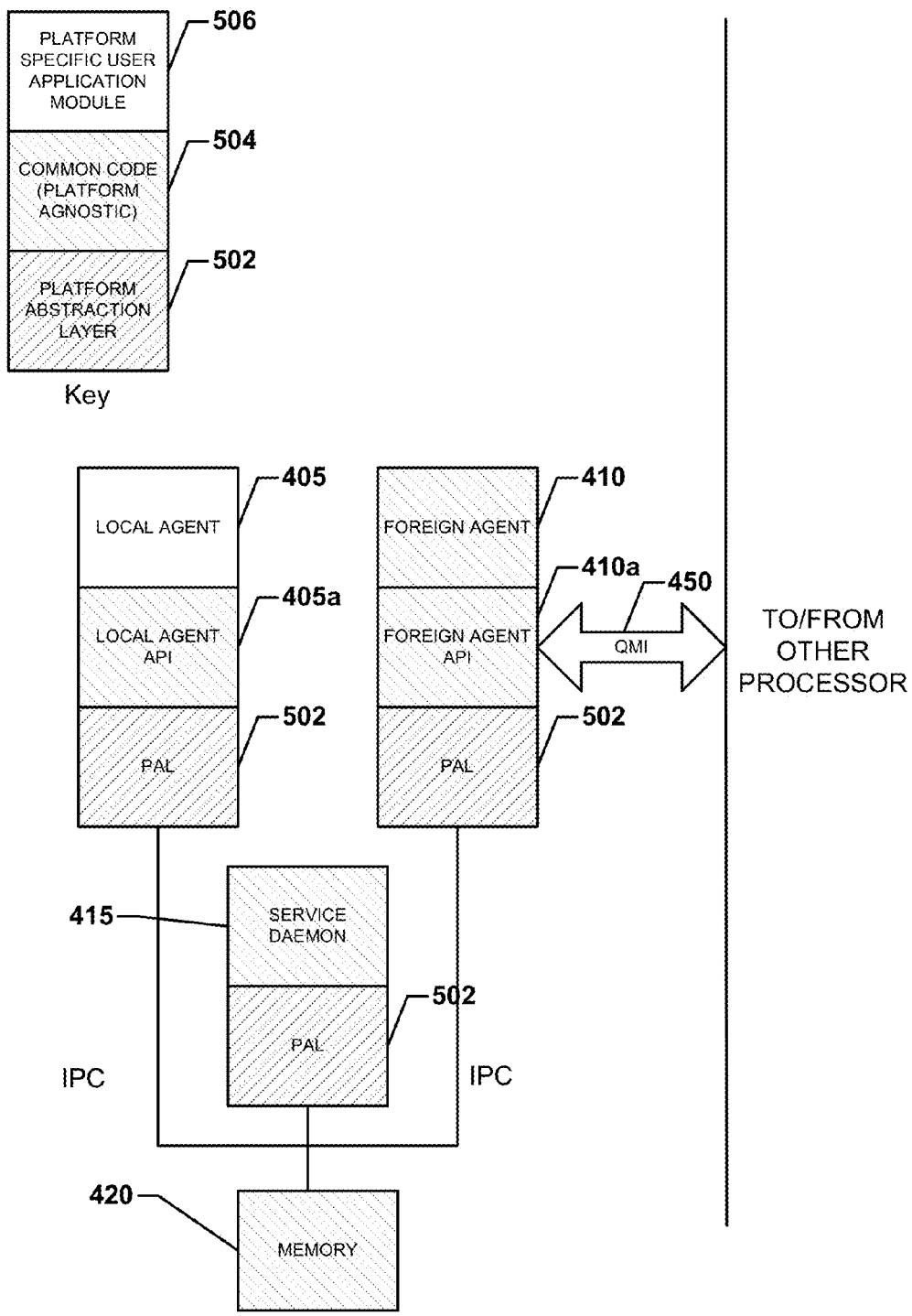
FIG. 5 illustrates a number of layers for intra-processor communication between a first local agent, a first foreign agent, a first service daemon and a first storage medium according to an aspect.

FIG. 5 illustrates a simplified high level diagram of a local agent 405 and a foreign agent 410 illustrating an aspect implementation. Implementation of the various aspects may be accomplished within a platform abstraction layer 502 and common code layer 504 which is platform agnostic so that platform specific and application modules are unaffected. The implementation in a platform abstraction layer 502 and in common code 504 is illustrated in the figure by hashing as explained in the key in FIG. 5.

The foreign agent 410 may be operatively connected to the memory 420 through the platform abstraction layer 502 which provides interprocessor communications (IPC). The local agent 405 may be similarly operatively connected to the memory 420 by IPC enabled by the platform abstraction layer 502. A service daemon 415 may be similarly operatively connected to the foreign agent 410, the local agent 405, and also connected to the memory 420.

The local agent 405 may communicate via the first platform specific user application module layer 506. A local agent API 405a may communicate via the common code platform agnostic layer 504. The local agent 405 may also communicate via a platform agnostic layer 502 with the service daemon 415.

The foreign agent 410 may communicate via a common code platform agnostic layer 504. The foreign agent API 410a may also communicate via the platform agnostic layer 502 with the service daemon 415. The foreign agent API 410a may also communicate via the common code platform agnostic layer 504 via a QMI protocol as illustrated by arrow 450 to and from the second processor (not shown). In another aspect, the foreign agent 410 may communicate via a different protocol, such as a remote procedure call (RPC), or an alternative protocol or communication method.

The service daemon 415 may communicate via the common code platform agnostic layer 504. The service daemon 415 may also communicate via the platform agnostic layer 502 with the local and the foreign agents 405, 410 and local and foreign agent APIs 405a and 410a.

The memory 420 is illustrated as being connected to the service daemon 415 and the foreign and local agents 405, 410, and may communicate via the common code platform agnostic layer 504.

Various advertisement capability messages may be received by the foreign agent 410 The foreign agent 410 associated with the processor may set a processor property via a set message communicated to the service daemon 415. In response to the set message, the service daemon 415 may write the processor capabilities to the memory 420 to set the processor property by a unique property name.

In addition, the foreign agent 410 may use a "get" message communicated to the service daemon 415 to read the processor property. In response, the service daemon 415 reads the processor property to determine the unique property name. The foreign agent 410 associated with the processor may initiate a registration and may transmit a registration message to the service daemon 415 in one aspect. The service daemon 415 may write the registration message to the memory 420. In addition, the foreign agent 410 may deliver polling messages to the service daemon 415. The registration mechanism may be any methodology by which the processor receives notifications automatically when a new or existing property value is determined or changed from another entity. The service daemon 415 may write the polling message to the memory 420 to poll the local agent 405 to determine the processor property. In an aspect, the registration may be a notification that is entered or recorded in an official list of property values, and which is communicated.

Figure 6:
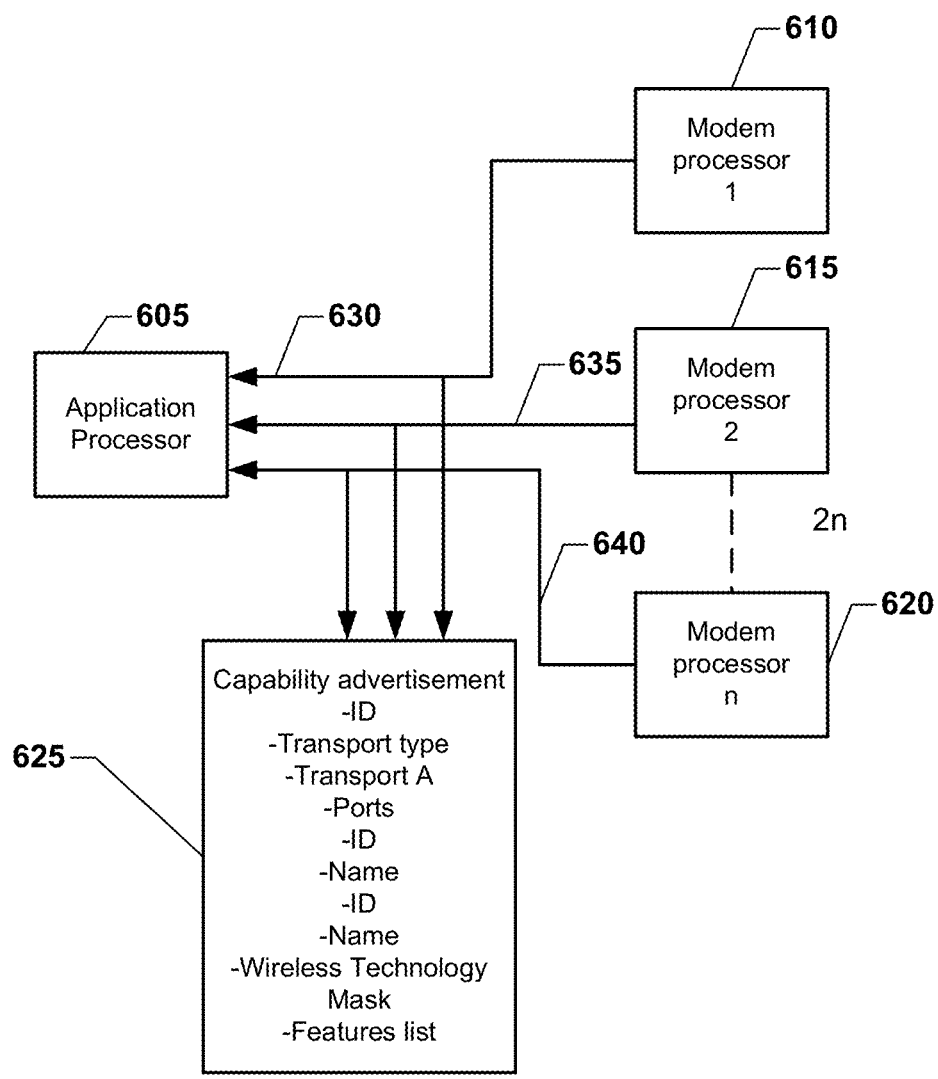
FIG. 6 is a component block diagram of a multi-processor computing device illustrating communication pathways between an application processor and a number of peer processors.

Turning to FIG. 6, an application processor 605 may communicate with a number of modem processors 610, 615, and 620. In these communications, the application processor 605 receives capability advertisements from a first modem processor 610, a second modem processor 615 and an n-th modem processor 620 via communication links 630, 635, and 640. Each of the capability advertisements 625 may include various data parameters of the processors 605, 610, 615, and 620 so the application processor 605 receiving the capability advertisement may dynamically discover the capabilities of the modem processors 610, 615, and 620, as well as any other processor transmitting capability advertisements 625. For example, the capability advertisement 625 may contain data of three or more processors 610-620 in a single message.

The capability advertisement 625 may take various forms and may include different data parameters contained therein. For example, the capability advertisement may include different data depending on the particular device, or the particular application processor 605 and the particular modem processors 610-620.

The capability advertisement includes data that enables the application processor 605 to discover the capabilities of the modem processors 610, 615, or 620. For example, the capability advertisement 625 may include identification information, such as the processor name, the transport information, or a transport type for the modem processors 610-620. Additionally, the capability advertisement 625 may include the port information, or the modem processors 610-620 port names or the modem processors 610-620 port identifications. The capability advertisement 625 may also include the technology information that includes a technology mask parameter that identifies technologies associated with the advertising modem processors 610-620. For example, if the second modem processor 615 is a graphics processor and delivers the capability advertisement 625, the second modem processor 615 may identify the graphics technology as a parameter in the advertisement. Additionally, the capability advertisement 625 may include a features list.

Figure 7:
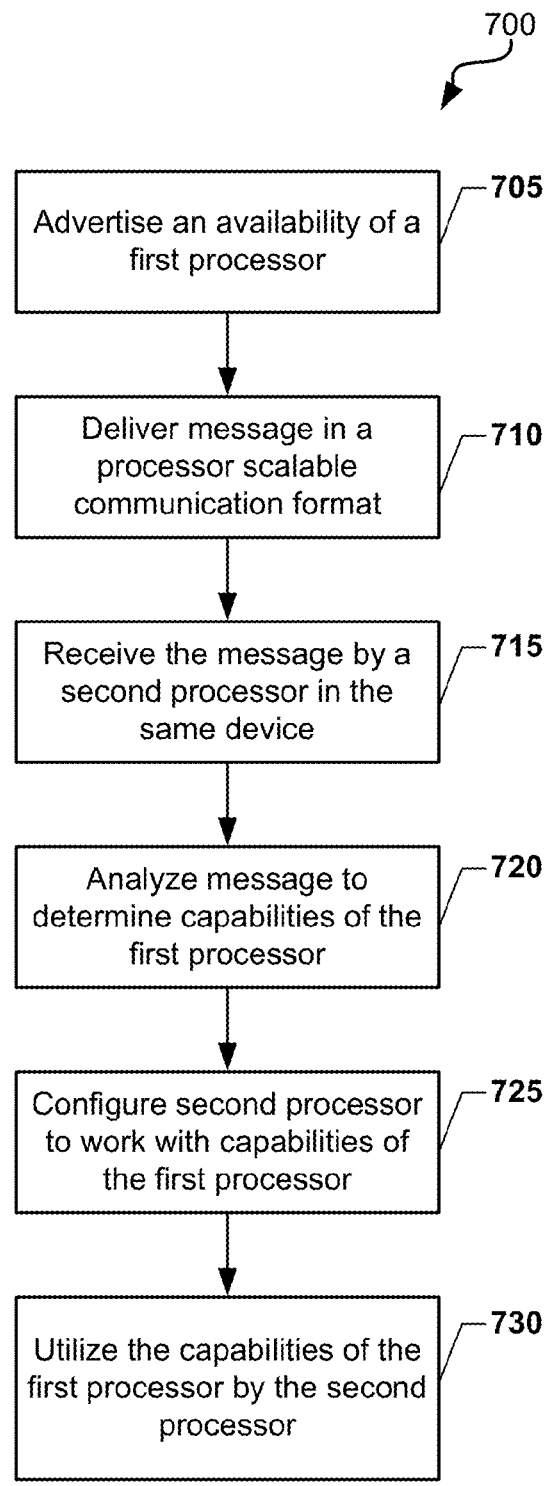
FIG. 7 is a process flow diagram of an aspect method for delivering a message in a processor scalable communication format so a second processor may determine the capabilities of a first processor and so the second processor may utilize the capabilities of the first processor.

FIG. 7 illustrates an aspect method 700 for delivering an advertisement message so that a first application processor can use the capabilities of a second modem processor, or vice versa. Method 700 may be implemented in a computing device having a processor configured with processor-executable instructions to perform operations of the method 700. In another alternative aspect, the method 700 may be implemented by an agent, a service daemon, and components of the processor.

In method 700, the processor may commence operation by advertising an availability of a first processor in block 705. The message may be delivered by the processor in a processor scalable communication format in block 710. In block 715, a second processor may receive the message in the same die or in the same device. In block 720, the second processor may analyze the message to determine the capabilities of the first processor. In block 725, the second processor may be configured to utilize the capabilities of the first processor based on the message received in block 715. In block 730, the second processor may utilize the capabilities of the first processor.

Figure 8:
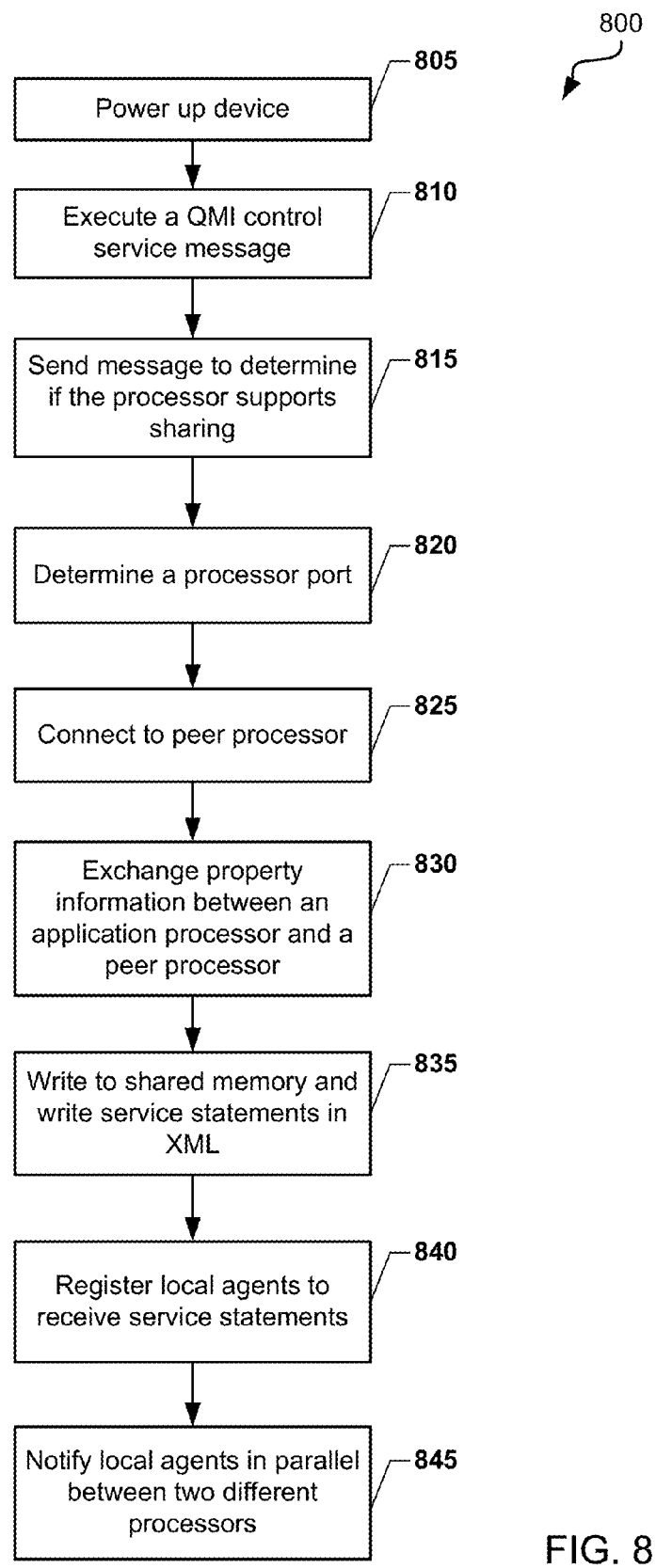
FIG. 8 is a process flow diagram of an aspect method for delivering a message and writing the message as a service statement to a memory so a local agent may read the service statement and configure a processor.

FIG. 8 illustrates an aspect method 800 for delivering an advertisement message so a first application processor can use the capabilities of a second modem processor, or vice versa, and illustrating the data contained within the advertisement message. Method 800 may be implemented in a computing device having a processor configured with processor-executable instructions to perform operations of the method 800. In another aspect, the method 800 may be implemented by agents, a service daemon, and components of the processor.

In block 805, the device may be turned on and powered up, and a QMI control service message may be executed by a service daemon in block 810. In block 815, a message may be delivered to determine if a processor supports sharing. In block 820, the processor may determine a processor port, and in block 825, the processor may connect to a peer processor. In block 830, property information may be exchanged between an application processor and a peer processor. In block 835, a service statement may be written in XML to a processor memory. In block 840, local agents may register to receive the service statements and in block 845, local agents may be notified in parallel between two different processors.

Figure 9A:
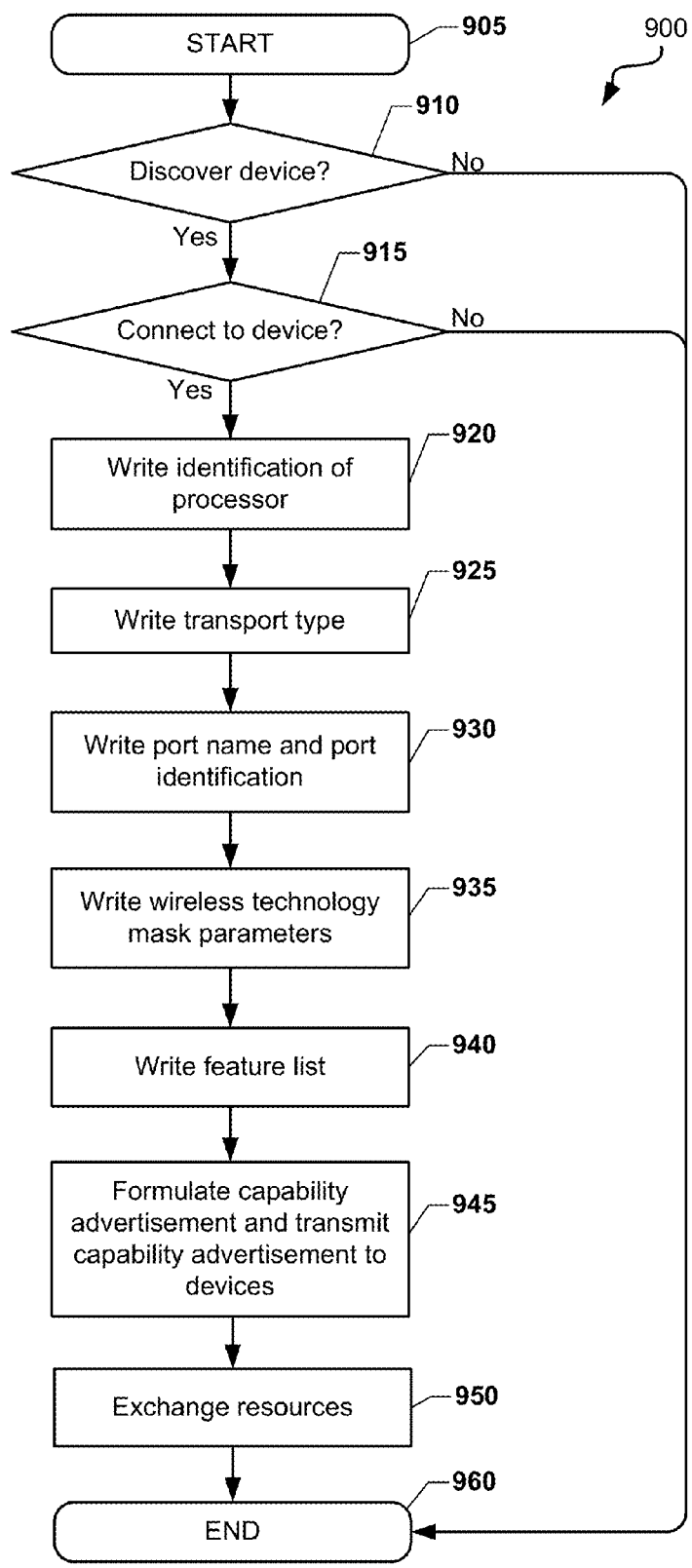
FIG. 9A is a process flow diagram of an aspect method for formulating a capability advertisement that is transmitted to devices to exchange processor resources.

FIG. 9A illustrates an aspect method 900 for delivering a capability advertisement message so an application processor and a peer processor may exchange resources. Method 900 may be implemented in a computing device having a processor configured with processor-executable instructions to perform the operations of the method 900. In block 905, the method 900 commences operation. In determination block 910, the processor determines whether a device has been discovered. If so (i.e., determination block 910="Yes"), the processor determines if the device should be connected to the processor in determination block 915. If so (i.e., determination block 915="Yes"), the processor proceeds to write an identification of the processor in block 920. In block 925, the processor may write a transport type in the advertisement capability message, and in block 930, the processor may write a port name or a port identification data. In block 935, the processor may write wireless technology mask parameters, and in block 940, the processor may write a features list. In block 945, the processor may formulate the capability advertisement and transmit the capability advertisement to the modem processor. In block 950, the modem processor may receive the capability advertisement and exchange resources.

Figure 9B:
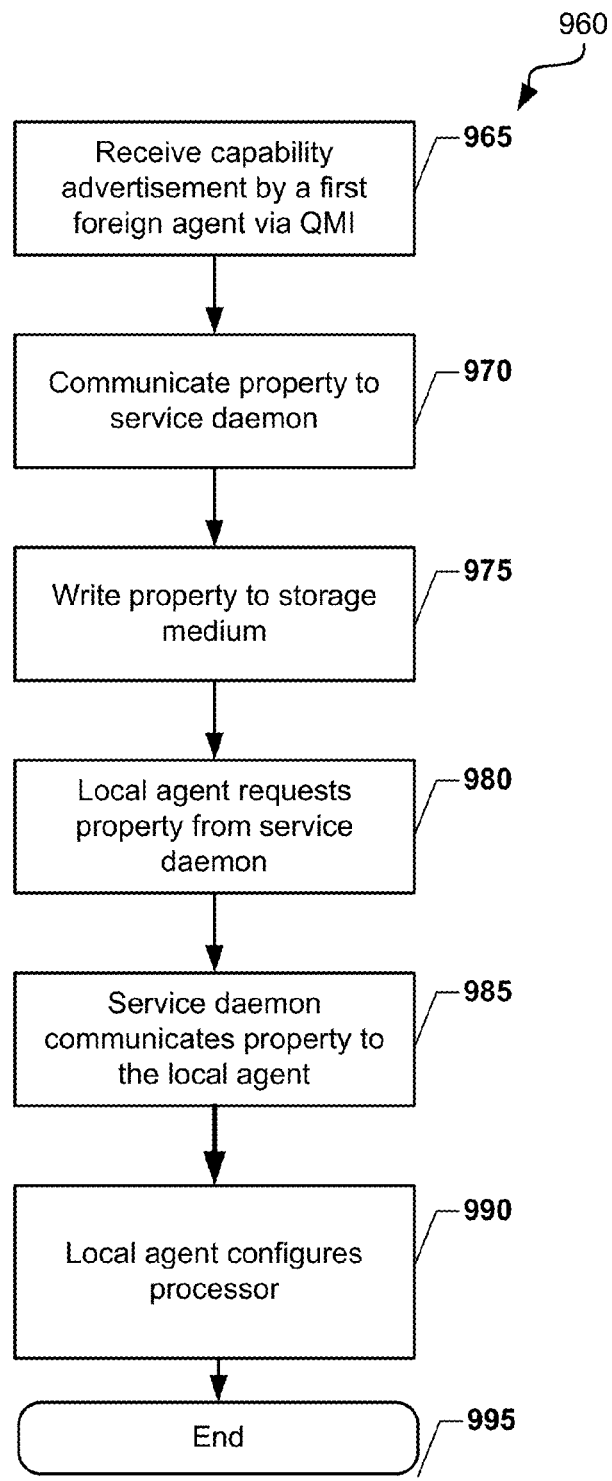
FIG. 9B is a process flow diagram of an aspect method for setting a property when the foreign agent receives a capability advertisement via an agnostic, scalable inter-processor communication link (e.g., the QMI protocol) within the processor.

FIG. 9B illustrates an aspect method 960 for delivering data from the foreign agent to the local agent within the application processor, once properties are received by the foreign agent. Method 960 may be implemented in a computing device having a processor configured with processor-executable instructions to perform the operations of the method 960. In block 965, a foreign agent may receive a capability advertisement via a QMI protocol message. In block 970, the foreign agent may communicate a property contained in the capability advertisement to the service daemon. In block 975, the service daemon may write the property to a shared storage medium. In block 980, the local agent may request the property from the service daemon. In block 985, the service daemon may communicate the property from the shared storage medium to the local agent. In block 990, the local agent may use the property to configure the processor. In block 995, the method 960 ends.

Figure 9C:
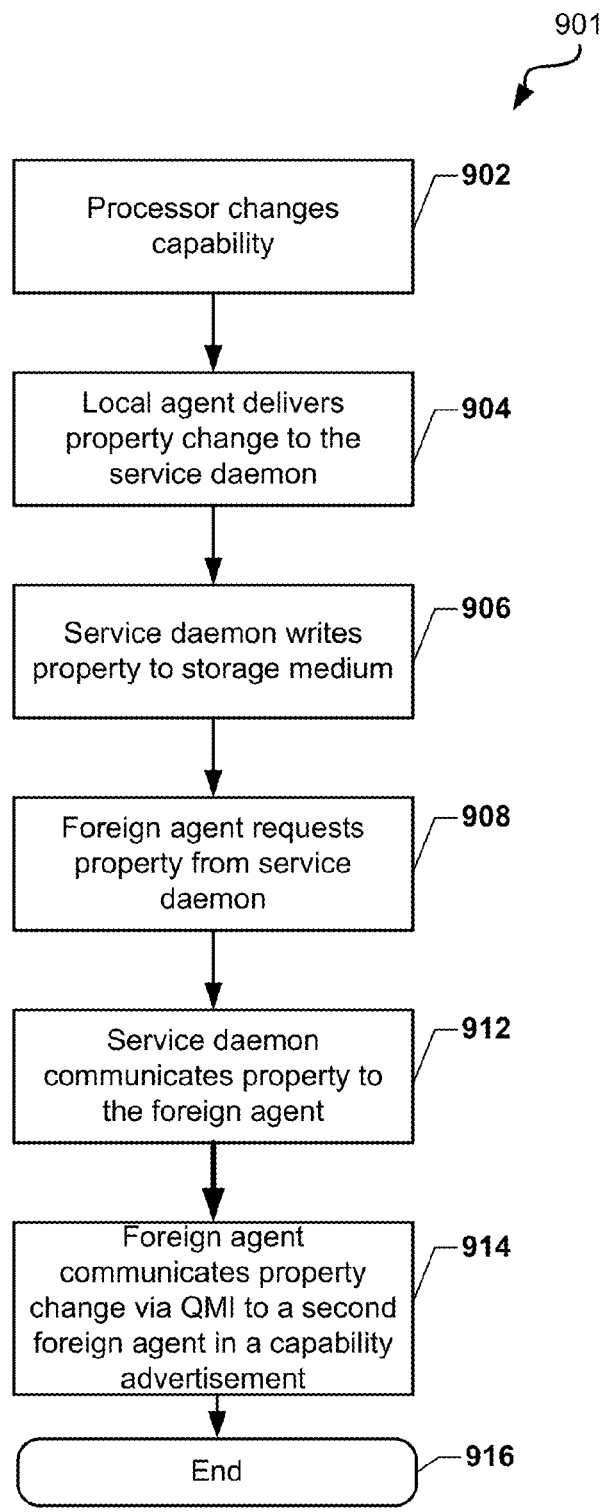
FIG. 9C is a process flow diagram of an aspect method for a processor changing a capability and the foreign agent transmitting a new capability advertisement via the agnostic, scalable inter-processor communication link (e.g., the QMI protocol).

FIG. 9C illustrates an aspect method 901 for transmitting data from the local agent to the foreign agent within the application processor, once properties are received by the local agent so the property can be delivered to a second foreign agent via a QMI protocol. In some aspects, capabilities of the application or peer processor may be modulated or changed and may need to be delivered in a capability advertisement to other processors in the form of an update. Method 901 may be implemented in a computing device having a processor configured with processor-executable instructions to perform the operations of the method 901. In another alternative aspect, method 901 may be performed by subcomponents of a processor. In block 902, a processor may change a capability. For example, the processor identification may change, the processor transport type may change, a features list of the processor may change, or a technology mask of the processor may change, or other capabilities may change. In block 904, the local agent may communicate a property change to the service daemon. In block 906, the service daemon may write the property to a shared storage medium. In block 908, the foreign agent may request the property from the service daemon. In block 912, the service daemon may communicate the property from the shared storage medium to the foreign agent. In block 914, the foreign agent may communicate the property change via a QMI protocol to a second foreign agent in a capability advertisement. In block 915, the method 901 ends.

Figure 10:
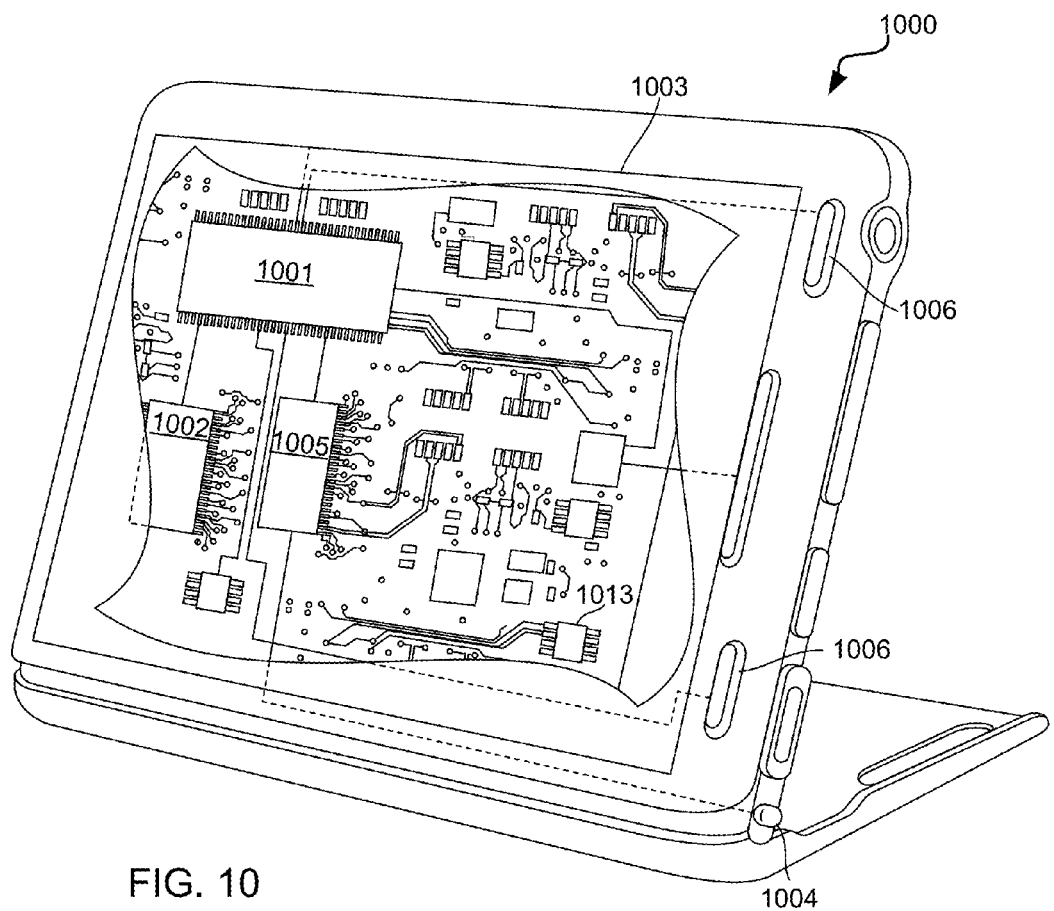
FIG. 10 is a component block diagram of a mobile computing device suitable for use in an aspect.

FIG. 10 is a system block diagram of a mobile computing device suitable for use with any of the aspects. The aspects may be implemented in a variety of mobile computing devices, particularly mobile computing devices. An example of a mobile computing device that may implement the various aspects is a smart phone 1000 illustrated in FIG. 10. A multi-processor mobile computing device, such as a smart phone 1000, may include a processor 1001 coupled to memory 1002 and to a radio frequency data modem 1005. The modem 1005 may be coupled to an antenna 1004 for receiving and transmitting radio frequency signals. The smart phone 1000 may also include a display 1003, such as a touch screen display. The mobile computing device 1000 may also include user input devices, such as buttons 1006, to receive user inputs.

The mobile computing device processor 1001 may be any programmable microprocessor, microcomputer, or multiple processor chip or chips that can be configured by software instructions (applications) to perform a variety of functions, including the functions of the various aspects described herein.

Typically, software applications may be stored in the internal memory 1002 before they are accessed and loaded into the processor 1001. In some mobile computing devices, additional memory chips (e.g., a Secure Data (SD) card) may be plugged into the mobile computing device and coupled to the processor 1001. The internal memory 1002 may be a volatile or nonvolatile memory, such as flash memory, or a mixture of both. For the purposes of this description, a general reference to memory refers to all memory accessible by the processor 1001, including internal memory 1002, removable memory plugged into the mobile computing device, and memory within the processor 1001.

Figure 11:
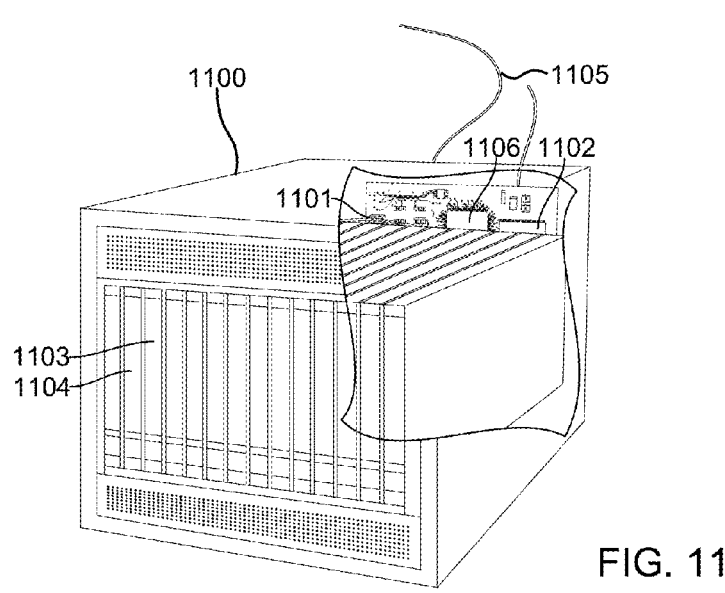
FIG. 11 is a component block diagram of a server device suitable for use in an aspect.

The various aspects may be implemented on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1106 coupled to the processor 1101. The server 1100 may also include network access ports 1104 coupled to the processor 1101 for establishing data connections with a network 1105, such as a local area network coupled to other broadcast system computers and servers. The processors 1001, 1101 may be any programmable microprocessor, microcomputer, or multiple processor chip or chips that can be configured by software instructions (applications) to perform a variety of functions, including the functions of the various aspects described above. In some devices, multiple processors 1001, 1101 may be provided, such as one processor dedicated to wireless communication functions and one processor dedicated to running other applications. Typically, software applications may be stored in the internal memory 1002, 1102, and 1103 before they are accessed and loaded into the processor 1001, 1101.

The processor 1001, 1101 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1001, 1101 including internal memory or removable memory plugged into the device and memory within the processor 1001, 1101 itself.

Figure 12:
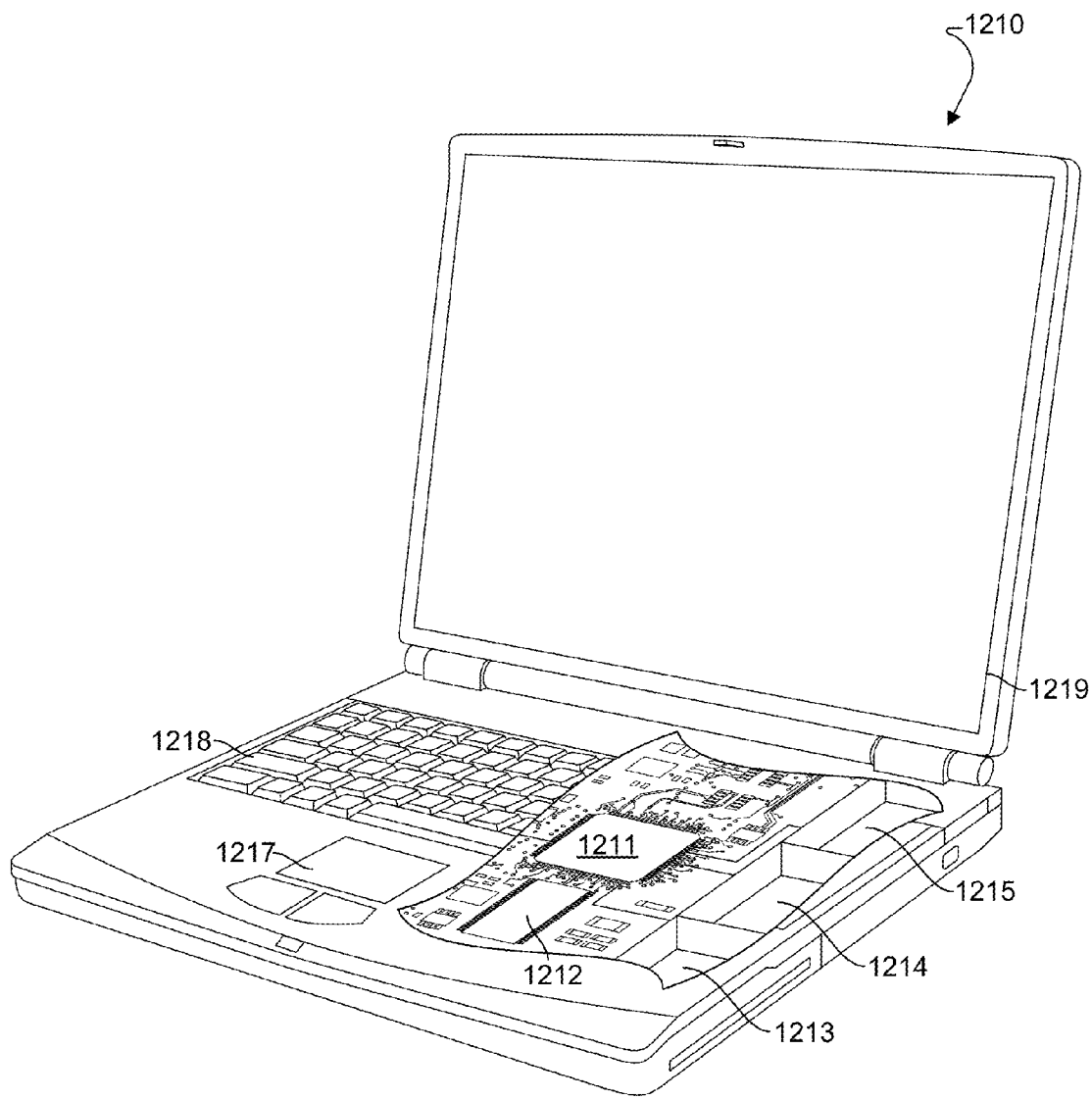
FIG. 12 is a component block diagram of a laptop computer device suitable for use in an aspect.

The aspects described above may also be implemented within a variety of personal computing devices, such as a laptop computer 1210 illustrated in FIG. 12. Many laptop computers include a touch pad touch surface 1217 that serves as the computer's pointing device, and thus may receive drag, scroll, and flick gestures similar to those implemented on mobile computing devices equipped with a touch screen display and described above. A laptop computer 1210 will typically include a processor 1211 coupled to volatile memory 1212 and a large capacity nonvolatile memory, such as a disk drive 1213 of Flash memory. The computer 1210 may also include a floppy disc drive 1214 and a compact disc (CD) drive 1215 coupled to the processor 1211. The computer device 1210 may also include a number of connector ports coupled to the processor 1211 for establishing data connections or receiving external memory devices, such as a USB or FireWire® connector sockets, or other network connection circuits for coupling the processor 1211 to a network. In a notebook configuration, the computer housing includes the touchpad 1217, the keyboard 1218, and the display 1219 all coupled to the processor 1211. Other configurations of computing device may include a computer mouse or trackball coupled to the processor (e.g., via a USB input) as are well known, which may also be use in conjunction with the various aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable or processor-readable storage medium. The steps of a method or algorithm disclosed herein may be embodied in a processor-executable software module executed which may reside on a non-transitory computer-readable medium. Non-transitory computer-readable and processor media include any available storage media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method by which processors within a multi-processor device dynamically configure themselves by exchanging availability messages that identify capabilities of each processor, the method comprising:

each processor advertising its availability message to all other processors within the multi-processor device in an agnostic processor scalable communication format;

each processor receiving availability messages from each other processor within the multi-processor device;

each processor using the received availability messages to discover capabilities of each other processor within the multi-processor device including an operation that the advertising processor can perform for the multi-processor device; and each processor automatically configuring itself to utilize at least some of the discovered capabilities of each other processor within the multi-processor device, wherein the advertised and received availability messages include at least one of identification information, transport type information, port information, technology information, features information, and any combinations of such information properties, and wherein:

a foreign agent in each processor generates the advertised availability message;

the foreign agent in each processor receives the received availability message from each other processor within the multi-processor device and passes the discovered capabilities to a service daemon within its processor; and the service daemon in each processor writes the discovered capabilities to a memory in its processor;

and wherein each processor automatically configuring itself to utilize the discovered capabilities of each other processor within the multi-processor device comprises:

a local agent in each processor obtaining the discovered capabilities from the memory via the service daemon in the processor and using the discovered capabilities to configure the processor to accomplish inter-processor communications; and the service daemon providing a notification to the local agent when a processor property is updated by the foreign agent when the local agent registers to receive updates for the processor property from the foreign agent.

2. The method of claim 1, wherein the advertised and received availability messages are each an inter-processor communication in which the agnostic processor scalable communication format is agnostic to a physical transport utilized between each processor.

3. The method of claim 1, further comprising:

each processor exchanging identification data via a daemon software program with each other processor within the multi-processor device, wherein the identification data is exchanged via the agnostic processor scalable communication format.

4. The method of claim 1, wherein each advertised availability message includes the identification information of the advertising processor.

5. The method of claim 1, wherein each advertised availability message includes the transport type information of the advertising processor.

6. The method of claim 1, wherein each advertised availability message includes port information of the advertising processor.

7. The method of claim 1, wherein each advertised availability message includes a technology mask parameter that identifies technologies associated with the advertising processor.

8. The method of claim 1, wherein two or more of the processors within the multi-processor device are located on a same die.

9. The method of claim 1, wherein the agnostic processor scalable communication format is ported on a top of a networking protocol.

10. The method of claim 1, wherein each advertised availability message is advertised by utilizing a control driver, wherein the agnostic processor scalable communication format is extendable beyond the multi-processor device.

11. The method of claim 1, wherein the foreign agent is an entity performing bidirectional message exchanges between its processor and each other processor within the multi-processor device, and wherein the foreign agent receives and transmits bidirectional message exchanges with the service daemon.

12. The method of claim 1, further comprising the foreign agent associated with each processor setting a processor property via a set message communicated to the service daemon, wherein the service daemon writes the discovered capabilities to the memory to set the processor property by a unique property name.

13. The method of claim 12, further comprising the foreign agent associated with each processor utilizing a get message communicated to the service daemon to read the processor property, wherein the service daemon reads the processor property to determine the unique property name.

14. The method of claim 13, further comprising:

the foreign and local agents associated with each processor registering themselves with the service daemon associated with its processor to receive notifications of property value changes; and the service daemon notifying the foreign and local agents registered with the service daemon of a change in a property value without polling.

15. The method of claim 1, wherein the service daemon comprises an executable process that sends and receives messages.

16. The method of claim 15, wherein the local agent is an entity that resides locally and that stores and reads data from the memory via the service daemon.

17. The method of claim 16, wherein the local agent sends and receives messages to and from the service daemon.

18. The method of claim 17, wherein the local agent retrieves, stores and registers for processor properties using the service daemon.

19. The method of claim 1, further comprising providing a notification to the local agent when a processor property is updated by the foreign agent.

20. The method of claim 19, further comprising the service daemon providing the notification to the local agent when the processor property is updated by the foreign agent.

21. A computing device, comprising: a plurality of processors, each of which is configured with processor-executable instructions to dynamically configure themselves by exchanging availability messages that identify capabilities of each processor by performing operations comprising:

advertising its availability message to all other processors within the computing device in an agnostic processor scalable communication format;

receiving availability messages from each other processor within the computing device;

using the received availability messages to discover capabilities of each other processor within the computing device including an operation that the advertising processor can perform for the computing device; and automatically configuring itself to utilize at least some of the discovered capabilities of each other processor within the computing device, wherein the advertised and received availability messages include at least one of identification information, transport type information, port information, technology information, features information, and any combinations of such information properties, such that:

a foreign agent in each processor configured to generate the advertised availability message, the foreign agent in each processor configured to receive the received availability message from each other processor within the computing device and passes the discovered capabilities to a service daemon within its processor, and the service daemon in each processor configured to write the discovered capabilities to a memory in its processor;

wherein each processor automatically configuring itself to utilize the discovered capabilities of each other processor within the computing device comprises:

a local agent in each processor configured to obtain the discovered capabilities from the memory via the service daemon in the processor and using the discovered capabilities to configure the processor to accomplish inter-processor communications; and the service daemon configured to provide a notification to the local agent when a processor property is updated by the foreign agent when the local agent registers to receive updates for the processor property from the foreign agent.

22. The computing device of claim 21, wherein the each of the plurality of processors is configured with processor executable instructions to perform operations such that the advertised and received availability messages are each in an inter-processor communication in which the agnostic processor scalable communication format is agnostic to a physical transport utilized between each of the processors.

23. The computing device of claim 21, wherein each of the plurality of processors is configured with processor-executable instructions to perform operations further comprising:

exchanging identification data via a daemon software program with each other processor of the computing device, wherein the identification data is exchanged via the agnostic processor scalable communication format.

24. The computing device of claim 21, wherein each of the plurality of processors is configured with processor-executable instructions to perform operations such that each advertised availability message includes the identification information of the advertising processor.

25. The computing device of claim 21, wherein each of the plurality of processors is configured with processor-executable instructions to perform operations such that each advertised availability message includes port information of the advertising processor.

26. The computing device of claim 21, wherein the processors is configured with processor-executable instructions to perform operations such that each advertised availability message includes a technology mask parameter that identifies technologies associated with the advertising processor.

27. The computing device of claim 21, wherein each of the plurality of processors is configured with processor-executable instructions to perform operations such that two or more of the processors within the computing device are located on a same die.

28. The computing device of claim 21, wherein each of the plurality of processors is configured with processor-executable instructions to perform operations such that each advertised availability message is advertised by utilizing a control driver, wherein the agnostic processor scalable communication format is extendable beyond the computing device.

29. The computing device of claim 21, wherein each of the plurality of processors is configured with processor-executable instructions to perform operations such that each advertised availability message includes the transport type information of the advertising processor.

30. The computing device of claim 29, wherein each of the plurality of processors is configured with processor-executable instructions to perform operations further comprising providing a notification to a local agent when a processor property is updated by a foreign agent.

31. The computing device of claim 21, wherein each of the plurality of processors is configured with processor-executable instructions to perform operations further comprising the foreign agent configured to set a processor property via a set message communicated to the service daemon, wherein the service daemon configured to writes the discovered capabilities to the memory to set the processor property by a unique property name.

32. The computing device of claim 21, wherein each of the plurality of processors is configured with processor-executable instructions such that the foreign agent is an entity performing bidirectional message exchanges between its processor and each other processor within the computing device , and the foreign agent configured to receive and transmit bidirectional message exchanges with the service daemon.

33. The computing device of claim 21, wherein each of the plurality of processors is configured with processor-executable instructions to perform operations further comprising the foreign agent utilizing a get message communicated to the service daemon to read the processor property, wherein the service daemon configured to read the processor property to determine a unique property name.

34. The computing device of claim 33, wherein each of the plurality of processors is configured with processor-executable instructions to perform operations further comprising:

the foreign and local agents configured to register themselves with the service daemon to receive notifications of a change in the processor property; and the service daemon configured to notify the foreign and local agents registered with the service daemon of the change in the processor property without polling.

35. The computing device of claim 21, wherein each of the plurality of processors is configured with processor-executable instructions such that the service daemon comprises an executable process that sends and receives messages.

36. The computing device of claim 35, wherein each of the plurality of processors is configured with processor-executable instructions such that the local agent is an entity that resides locally and that stores and reads data from the memory via the service daemon.

37. The computing device of claim 36, wherein each of the plurality of processors is configured with processor-executable instructions such that the local agent configured to send and receives messages to and from the service daemon.

38. The computing device of claim 37, wherein each of the plurality of processors is configured with processor-executable instructions such that the local agent configured to retrieve, store and register for processor properties using the service daemon.

39. A computing device including a plurality of processors configured to dynamically configure themselves by exchanging availability messages that identify capabilities of each processor, each of the plurality of processors comprising:
   means for advertising its availability message to all other processors within the computing device in an agnostic processor scalable communication format;
   means for receiving availability messages from each other processor within the computing device;
   means for using the received availability messages to discover capabilities of each other processor within the computing device including an operation that the advertising processor can perform for the computing device; and
   means for automatically configuring itself to utilize at least some of the discovered capabilities of each other processor within the computing device,
   wherein the advertised and received availability messages include at least one of identification information, transport type information, port information, technology information, features information, and any combinations of such information properties, and wherein means for advertising the availability message comprises:
      a foreign agent in each processor that generates the advertised availability message;
      wherein the foreign agent in each processor configured to receive the received availability messages from each other processor within the computing device and passes the discovered capabilities to a service daemon within its processor; and
      the service daemon in each processor configured to write the discovered capabilities to a memory in its processor;
   and wherein means for automatically configuring itself to utilize the discovered capabilities of each other processor within the computing device comprises:
      a local agent in each processor configured to obtain the discovered capabilities from the memory via the service daemon and using the discovered capabilities to configure its processor to accomplish inter-processor communications, wherein the service daemon configured to provide a notification to the local agent when the processor property is updated by the foreign agent.

40. The computing device of claim 39, wherein the advertised and received availability messages are each in an inter-processor communication in which the agnostic processor scalable communication format is agnostic to a physical transport utilized between each processor.

41. The computing device of claim 39, wherein each of the plurality of processors further comprises:
   means for exchanging identification data via a daemon software program with each other processor of the computing device, wherein the identification data is exchanged via the agnostic processor scalable communication format.

42. The computing device of claim 39, wherein each advertised availability message includes the identification information of the advertising processor.

43. The computing device of claim 39, wherein each advertised availability message includes the transport type information of the advertising processor.

44. The computing device of claim 39, wherein each advertised availability message includes port information of the advertising processor.

45. The computing device of claim 39, wherein each advertised availability message includes a technology mask parameter that identifies technologies associated with the advertising processor.

46. The computing device of claim 39, wherein at least two of the plurality of processors within the computing device are located on a same die.

47. The computing device of claim 39, wherein each of the means for advertising its availability message and the means for receiving availability messages utilize a control driver, wherein the agnostic processor scalable communication format is extendable beyond the computing device.

48. The computing device of claim 39, wherein the foreign agent of each processor comprises means for performing bidirectional message exchanges between its processor and each other processor within the computing device, wherein the foreign agent configured to receive and transmit bidirectional message exchanges with the service daemon.

49. The computing device of claim 39, wherein each of the plurality of processors further comprises means for providing a notification to the local agent when a processor property is updated by the foreign agent if the local agent registers to receive updates for the processor property from the foreign agent.

50. The computing device of claim 39, wherein each of the plurality of processors further comprises means for setting a processor property via a set message communicated to the service daemon, wherein the service daemon configured to write the discovered capabilities to memory to set the processor property by a unique property name.

51. The computing device of claim 50, wherein each of the plurality of processors further comprises means for utilizing a get message communicated to the service daemon to read the processor property, wherein the service daemon configured to read the processor property to determine the unique property name.

52. The computing device of claim 51, wherein each of the plurality of processors further comprises:
   means for registering the foreign and local agents with the service daemon to receive notifications of a change in the processor property; and
   means for the service daemon notifying the foreign and local agents registered with the service daemon of the change in the processor property without polling.

53. The computing device of claim 39, wherein the service daemon of each of the plurality of processors comprises an executable process that receives messages.

54. The computing device of claim 53, wherein the local agent of each of the plurality of processors is an entity that resides locally and that stores and reads data from the memory via the service daemon of the respective processor.

55. The computing device of claim 54, wherein the local agent of each of the plurality of processors configured to send and receive messages to and from the service daemon of the respective processor.

56. The computing device of claim 55, wherein the local agent of each of the plurality of processors configured to retrieve, store and register for processor properties using the service daemon of the respective processor.

57. A non-transitory processor-readable medium having stored thereon processor-readable instructions configured to cause each processor within a computing device having a plurality of processors to perform operations comprising:
   advertising its availability message to all other processors within the computing device in an agnostic processor scalable communication format;

receiving availability messages from each other processor within the computing device;

using the received availability messages to discover capabilities of each other processor within the computing device including an operation that the advertising processor can perform for the computing device; and automatically configuring itself to utilize at least some of the discovered capabilities of each other processor within the computing device, wherein the advertised and received availability messages include at least one of identification information, transport type information, port information, technology information, features information, and any combinations of such information properties, and the stored processor-executable instructions are configured to cause each processor to perform operations such that:

a foreign agent in each processor generates the advertised availability message;

the foreign agent in each processor receives the received availability message from each other processor within the computing device and passes the discovered capabilities to a service daemon within processor; and the service daemon in each processor writes the discovered capabilities to a memory in its processor;

and such that automatically configuring itself to utilize at least some of the discovered capabilities of each other processor within the computing device comprises:

a local agent in each processor obtaining the discovered capabilities from the memory via the service daemon in the processor and using the discovered capabilities to configure the processor to accomplish inter-processor communications; and the service daemon providing a notification to the local agent when a processor property is updated by the foreign agent.

58. The non-transitory processor-readable medium of claim 57, wherein the stored processor-executable instructions are configured to cause each processor within a computing device having a plurality of processors to perform operations such that the advertised and received availability messages are each in an inter-processor communication in which the agnostic processor scalable communication format is agnostic to a physical transport utilized between each of the processors.

59. The non-transitory processor-readable medium of claim 57, wherein the stored processor-executable instructions are configured to cause each processor within the computing device to perform operations further comprising:

exchanging identification data via a daemon software program with each other processor of the plurality of processors, wherein the identification data is exchanged via the agnostic processor scalable communication format.

60. The non-transitory processor-readable medium of claim 57, wherein the stored processor-executable instructions are configured to cause each processor within a computing device having a plurality of processors to perform operations such that each advertised availability message includes the identification information of the advertising processor.

61. The non-transitory processor-readable medium of claim 57, wherein the stored processor-executable instructions are configured to cause each processor within a computing device having a plurality of processors to perform operations such that each advertised availability message includes the transport type information of the advertising processor.

62. The non-transitory processor-readable medium of claim 57, wherein the stored processor-executable instructions are configured to cause each processor within a computing device having a plurality of processors to perform operations such that each advertised availability message includes port information of the advertising processor.

63. The non-transitory processor-readable medium of claim 57, wherein the stored processor-executable instructions are configured to cause each processor within a computing device having a plurality of processors to perform operations such that each advertised availability message includes a technology mask parameter that identifies technologies associated with the advertising processor.

64. The non-transitory processor-readable medium of claim 57, wherein the stored processor-executable instructions are configured to cause each processor within a computing device having a plurality of processors to perform operations such that two or more of the processors within the computing device are located on a same die.

65. The non-transitory processor-readable medium of claim 57, wherein the stored processor-executable instructions are configured to cause each processor within a computing device having a plurality of processors to perform operations such that each advertised availability message is advertised by utilizing a control driver, wherein the agnostic processor scalable communication format is extendable beyond the computing device.

66. The non-transitory processor-readable medium of claim 57, wherein the stored processor-executable instructions are configured to cause each processor within a computing device having a plurality of processors to perform operations such that the foreign agent is an entity performing bidirectional message exchanges between its processor and each other processor within the computing device wherein the foreign agent receives and transmits bidirectional message exchanges with the service daemon.

67. The non-transitory processor-readable medium of claim 57, wherein the stored processor-executable instructions are configured to cause each processor within a computing device having a plurality of processors to perform operations further comprising providing a notification to the local agent when a processor property is updated by the foreign agent.

68. The non-transitory processor-readable medium of claim 57, wherein the stored processor-executable instructions are configured to cause each processor within a computing device having a plurality of processors to perform operations such that a notification is provided to the local agent when a processor property is updated by the foreign agent if the local agent registers to receive updates for the processor property from the foreign agent.

69. The non-transitory processor-readable medium of claim 57, wherein the stored processor-executable instructions are configured to cause each processor within a computing device having a plurality of processors to perform operations such that the service daemon comprises an executable process that sends and receives messages.

70. The non-transitory processor-readable medium of claim 69, wherein the stored processor-executable instructions are configured to cause each processor within a computing device having a plurality of processors to perform operations such that the local agent is an entity that resides locally and that stores and reads data from the memory via the service daemon.

71. The non-transitory processor-readable medium of claim 70, wherein the stored processor-executable instructions are configured to cause each processor within a computing device having a plurality of processors to perform operations such that the local agent sends and receives messages to and from the service daemon.

72. The non-transitory processor-readable medium of claim 71, wherein the stored processor-executable instructions are configured to cause each processor within a computing device having a plurality of processors to perform operations such that the local agent retrieves, stores and registers for processor properties using the service daemon.

73. The non-transitory processor-readable medium of claim 57, wherein the stored processor-executable instructions are configured to cause each processor within a computing device having a plurality of processors to perform operations further comprising the foreign agent setting a processor property via a set message communicated to the service daemon, wherein the service daemon writes the discovered capabilities to the memory to set the processor property by a unique property name.

74. The non-transitory processor-readable medium of claim 73, wherein the stored processor-executable instructions are configured to cause each processor within a computing device having a plurality of processors to perform operations further comprising the foreign agent utilizing a get message communicated to the service daemon to read the processor property, wherein the service daemon reads the processor property to determine the unique property name.

75. The non-transitory processor-readable medium of claim 74, wherein the stored processor-executable instructions are configured to cause each processor within a computing device having a plurality of processors to perform operations further comprising:

the foreign and local agents registering themselves with the service daemon to receive notifications of a change in the processor property; and the service daemon notifying the foreign and local agents registered with the service daemon of the change in the processor property without polling.

* * * * *